US009614850B2

(12) United States Patent
Zacher et al.

(10) Patent No.: US 9,614,850 B2
(45) Date of Patent: *Apr. 4, 2017

(54) DISABLING PROHIBITED CONTENT AND IDENTIFYING REPEAT OFFENDERS IN SERVICE PROVIDER STORAGE SYSTEMS

(71) Applicant: Microsoft Corporation, Redmond, WA (US)

(72) Inventors: Ryan Zacher, Woodinville, WA (US); Jorge Pozas Trevino, Seattle, WA (US); Emmanuel Miranda-Steiner, Seattle, WA (US); Dhaval Shah, Bellevue, WA (US); Omar Shahine, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/082,044

(22) Filed: Nov. 15, 2013

(65) Prior Publication Data

US 2015/0143466 A1    May 21, 2015

(51) Int. Cl.
*G06F 7/04*         (2006.01)
*G06F 15/16*        (2006.01)
(Continued)

(52) U.S. Cl.
CPC ............ *H04L 63/10* (2013.01); *G06F 21/554* (2013.01); *G06F 2221/2101* (2013.01); *H04L 2463/103* (2013.01)

(58) Field of Classification Search
CPC ...................................................... H04L 63/10
(Continued)

(56) References Cited

U.S. PATENT DOCUMENTS 6,684,254 B1    1/2004 Dutta
7,020,774 B1 *  3/2006 Cornuejols ............ G06Q 20/00
                                                705/67

(Continued)

FOREIGN PATENT DOCUMENTS

WO    2010031413 A1    3/2010

OTHER PUBLICATIONS

"Content Blocking", Retrieved Date: Jan. 17, 2013, Available at: http://help.opera.com/Mac/11.60/en/contentblock.html.

(Continued)

*Primary Examiner* — Dant Shaifer Harriman (57) ABSTRACT

Objects in a shared storage system can be marked as including prohibited content. Incidents that result in objects being so marked can be stored in an incident history associated with a user responsible for those objects. The incident history can be processed to identify repeat offenders and modify access privileges of those users. However, when objects are shared by one user with another user, prohibited content is blocked from being shared, while the remainder of the shared objects can be accessed by the other user. Functions that allow sharing of content are implemented so as prevent sharing of prohibited content with another user, while allowing other content to be shared. If a group of files or objects is shared, then the presence of prohibited content in one object in the group results in that prohibited content not being shared, but the remaining files or objects are still shared.

20 Claims, 7 Drawing Sheets (51) Int. Cl.
  *G06F 17/30* (2006.01)
  *H04L 29/06* (2006.01)
  *G06F 21/55* (2013.01)
(58) Field of Classification Search
  USPC .......................................................... 726/4
  See application file for complete search history.

(56) References Cited

U.S. PATENT DOCUMENTS

| | | | |
|---|---|---|---|
| 7,536,386 B2 | 5/2009 | Samji et al. | |
| 7,580,933 B2 | 8/2009 | Johnson et al. | |
| 7,627,652 B1* | 12/2009 | Commons ........... | H04L 67/1097 709/213 |
| 7,653,733 B2 | 1/2010 | Beyda | |
| 7,783,665 B1 | 8/2010 | Tormasov et al. | |
| 7,979,369 B2 | 7/2011 | Grenier et al. | |
| 7,991,957 B2 | 8/2011 | Mercer | |
| 8,117,226 B2 | 2/2012 | Samji et al. | |
| 8,312,485 B2 | 11/2012 | Robson et al. | |
| 8,380,632 B2 | 2/2013 | Dicke et al. | |
| 8,434,126 B1 | 4/2013 | Schepis et al. | |
| 8,504,653 B1* | 8/2013 | Commons ........... | H04L 67/1097 709/217 |
| 8,769,300 B2 | 7/2014 | Catrein et al. | |
| 9,049,176 B2 | 6/2015 | Ferdowsi et al. | |
| 9,288,283 B2 | 3/2016 | Alten | |
| 9,294,485 B2 | 3/2016 | Allain et al. | |
| 9,325,571 B2 | 4/2016 | Chen | |
| 2001/0041989 A1 | 11/2001 | Vilcauskas | |
| 2003/0126267 A1* | 7/2003 | Gutta ................ | G06F 17/30867 709/229 |
| 2005/0021780 A1 | 1/2005 | Beyda | |
| 2005/0132220 A1 | 6/2005 | Chang et al. | |
| 2005/0183143 A1* | 8/2005 | Anderholm ............. | G06F 11/32 726/22 |
| 2005/0198031 A1 | 9/2005 | Pezaris et al. | |
| 2008/0052514 A1 | 2/2008 | Nakae | |
| 2008/0104393 A1 | 5/2008 | Glasser et al. | |
| 2008/0133445 A1 | 6/2008 | Pennington | |
| 2008/0168490 A1 | 7/2008 | Yu | |
| 2009/0012965 A1* | 1/2009 | Franken ................. | G06Q 10/10 |
| 2009/0055915 A1* | 2/2009 | Piliouras ................ | G06F 21/41 726/8 |
| 2009/0138808 A1 | 5/2009 | Moromisato et al. | |
| 2010/0037324 A1* | 2/2010 | Grant .................... | G06F 21/554 726/27 |
| 2010/0146269 A1* | 6/2010 | Baskaran ................ | G06F 21/10 713/165 |
| 2011/0078197 A1 | 3/2011 | Zurko et al. | |
| 2011/0149809 A1* | 6/2011 | Narayanaswamy | H04L 12/1818 370/260 |
| 2012/0005159 A1 | 1/2012 | Wang et al. | |
| 2012/0157049 A1 | 6/2012 | Eliovits et al. | |
| 2012/0221627 A1 | 8/2012 | Sainio et al. | |
| 2012/0246732 A1 | 9/2012 | Burton | |
| 2012/0254304 A1 | 10/2012 | Anbalagan et al. | |
| 2012/0311039 A1 | 12/2012 | Ogawa | |
| 2013/0031643 A1 | 1/2013 | Rogel et al. | |
| 2013/0047260 A1* | 2/2013 | Hoefel ............. | G06F 17/30867 726/27 |
| 2013/0054477 A1 | 2/2013 | Steele | |
| 2013/0081141 A1* | 3/2013 | Anurag .................. | G06F 21/55 726/23 |
| 2013/0117131 A1 | 5/2013 | Robinson et al. | |
| 2013/0117190 A1 | 5/2013 | Wald | |
| 2013/0275398 A1 | 10/2013 | Dorman et al. | |
| 2014/0143542 A1 | 5/2014 | Chang | |
| 2014/0149461 A1 | 5/2014 | Wijayaratne et al. | |
| 2014/0230018 A1 | 8/2014 | Anantharaman | |
| 2014/0351541 A1 | 11/2014 | Angelo et al. | |
| 2014/0351957 A1 | 11/2014 | Zacher | |

OTHER PUBLICATIONS

"Fiickr Safety Guide", Retrieved Date: Jan. 17, 2013, Available at: https://info.yahoo.com/safely/us/yahoo/flickr/.
"How to Report Things", Published Date: Jan. 8, 2013, Available at: http://web.archive.org/web/20130108122508/https://www.facebook.com/help/181495968648557/.
"Final Office Action Received for U.S. Appl. No. 13/901,545", Mailed Date: May 22, 2015, 13 Pages.
"Non-Final Office Action Received for U.S. Appl. No. 13/901,545", Mailed Date: Sep. 29, 2014, 9 Pages.
"Non-Final Office Action Received for U.S. Appl. No. 13/901,559", Mailed Date: Jul. 17, 2015, 10 Pages.
Jujjuri, et al., "VirtFS-A Virtualization Aware File System Pass-through", In Proceedings of the Ottawa Linux Symposium, Jul. 2010, 14 Pages.
Shami, et al., "Browse and Discover: Social File Sharing in the Enterprise", In Proceedings of the ACM Conference on Computer Supported Cooperative work, Mar. 19, 2011, pp. 295-304.
Suhendra, Vivy, "A Survey on Access Control Deployment", In Security Technology, Dec. 8, 2011, pp. 11-20.
Surur, "Watch What You Store on SkyDrive—You may Lose Your Microsoft Life", Published Date: Jul. 19, 2012, Available at: http://wmpoweruser.com/watch-what-you-store-on-skydriveyou-may-lose-your-microsoft-life/.
Yu, et al., "Achieving Secure, Scalable, and Fine-grained Data Access Control in Cloud Computing", In Proceedings of the 29th Conference on Information Communications, Mar. 14, 2010, 9 Pages.
"International Search Report & Written Opinion Received for PCT Patent Application No. PCT/US2013/058362", Mailed Date: Jan. 30, 2014, 9 Pages.
Agrawal, Swati, "Detecting Copyright Infringement on YouTube Videos using YouTube Metadata", In Department of Computer Science and Engineering, MTech Theses, Apr. 2, 2013, 46 pages.
"CyberScan (Online IP Infringement Detection Service)", Published on: Jul. 2011, Available at: http://www.hcltech.com//sites/default/files/CyberScan.pdf.
"Autonomy's Virage Automates Copyright Infringement Detection for Online Video", Published on: Apr. 5, 2007, Available at: http://www.autonomy.com/content/News/Releases/2007/0405a.en.html.
U.S. Appl. No. 13/901,545, filed May 23, 2013, Ryan Zacher et al.
U.S. Appl. No. 13/901,559, filed May 23, 2013, Mary Angelo.
"Non-Final Office Action Issued in U.S. Appl. No. 13/901,545", Mailed Date: Dec. 17, 2015, 17 Pages.
"Final Office Action Issued in U.S. Appl. No. 13/901,559", Mailed Date: Jan. 26, 2016, 10 Pages.
"Final Office Action Issued in U.S. Appl. No. 13/901,545", Mailed Date: Aug. 15, 2016, 25 Pages.
"Non Final Office Action Issued in U.S. Appl. No. 13/901,559", Mailed Date: Aug. 12, 2016, 9 Pages.

\* cited by examiner

DISABLING PROHIBITED CONTENT AND IDENTIFYING REPEAT OFFENDERS IN SERVICE PROVIDER STORAGE SYSTEMS

BACKGROUND

Computer users increasingly share data through storage systems hosted by service providers on computer networks such as the internet. Service providers, however, may be required to address situations in which users share content for which distribution is prohibited, such as unlicensed copyrighted works or trademarked goods, which are brought to the attention of the service provider by a third party. Other types of prohibited content include, but are not limited to, other intellectual property or defamatory content in some jurisdictions.

There are a variety of ways in which service providers determine that prohibited content exists on a system. However, even if such content is identified, a question that remains is what to do about it.

SUMMARY

This Summary introduces selected concepts in simplified form that are further described below in the Detailed Description. This Summary is intended neither to identify key or essential features of the claimed subject matter, nor to limit the scope of the claimed subject matter.

When objects are shared by one user with another user, prohibited content, if identified as such, can be blocked from being shared, while the remainder of the shared objects can be accessed by the other user. Incidents that occur related to such prohibit content, such as marking the content in response to a third party notification that such content is prohibited, are stored in a history for a user. This history is processed to determine if a user is a repeat offender. Various account privileges from the service provider can be affected when a user becomes a repeat offender, such as termination of the account, prevention of sharing of files through the account, and the like.

In one example implementation, metadata for each data file can include a prohibited content flag indicating whether the file has been marked as containing prohibited content. Functions that allow sharing of content are implemented so as prevent sharing of prohibited content with another user, while allowing other content to be shared. If a group of files or objects is shared, then the presence of the prohibited content in one object in the group results in that prohibited content not being shared, but the remaining files or objects are still shared.

In one example implementation, metadata associated with each user includes an incident history, including a date and information about one or more files that were deemed to contain prohibited content. The information can include a file name or other identifier for an object, a hash of contents of the object, or other indication of the object. The information also can indicate the nature of the incident, such as a copyright violation, and the like. When an incident occurs with respect to a user, and that user's content is marked as prohibited, the incident history is updated. The incident history can be processed after an incident is added to determine if rules for changing the access privileges of the user are triggered. For example, if a number of incidents in a given time period occur, the access privileges of the user can be changed, for example, to prevent sharing files with other users.

A graphical user interface for accessing the storage system, whether by providers or recipients of shared content, can selectively render information about objects with prohibited content. For example, the interface can indicate the presence of an object, but access to prohibited content in that object can remain limited. In one implementation, the interface can present information indicating that access to the object is blocked due to its inclusion of prohibited content.

In an implementation in a file system, other file system operations can be implemented to allow access to parts of the file or data about the file, but the prohibited content is not made available. For example, in one implementation a file includes multiple file streams, including at least a metadata stream and a data stream. If a file contains prohibited content in the data stream, then access to the data stream is prevented; however, access to the metadata stream can be enabled. Metadata that is derivative of the prohibited content also can be removed, not generated or made not accessible. For example, for image files, a reduced image, representative of the image in the file, can be either removed, not generated, or made not accessible. Because the file is stored in a shared storage system, what data is made available about the file, and how it is stored, can also be function of both the prohibited content flag, the access privileges of the user that created the file, and the identity or role of the user accessing the file, using access control information for the file.

Such a prohibited content flag on a file object can be used in combination with one or more other flags that indicate that access to a file object, such as sharing of a file object, is blocked. For example, objectionable content may be marked using a restricted content flag. Such a file object also can be marked as including prohibited content. Sharing of content from such a file object can be blocked if either or both flags are set for a file object, while changes to a user's access privileges may be limited to incidents related to marking a file object as containing prohibited content.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which a shared storage system can be implemented. This example is provided in the context of an online, shared file system for multiple users to access over a computer network. Other implementations of a shared storage service also can be used.

Figure 1:
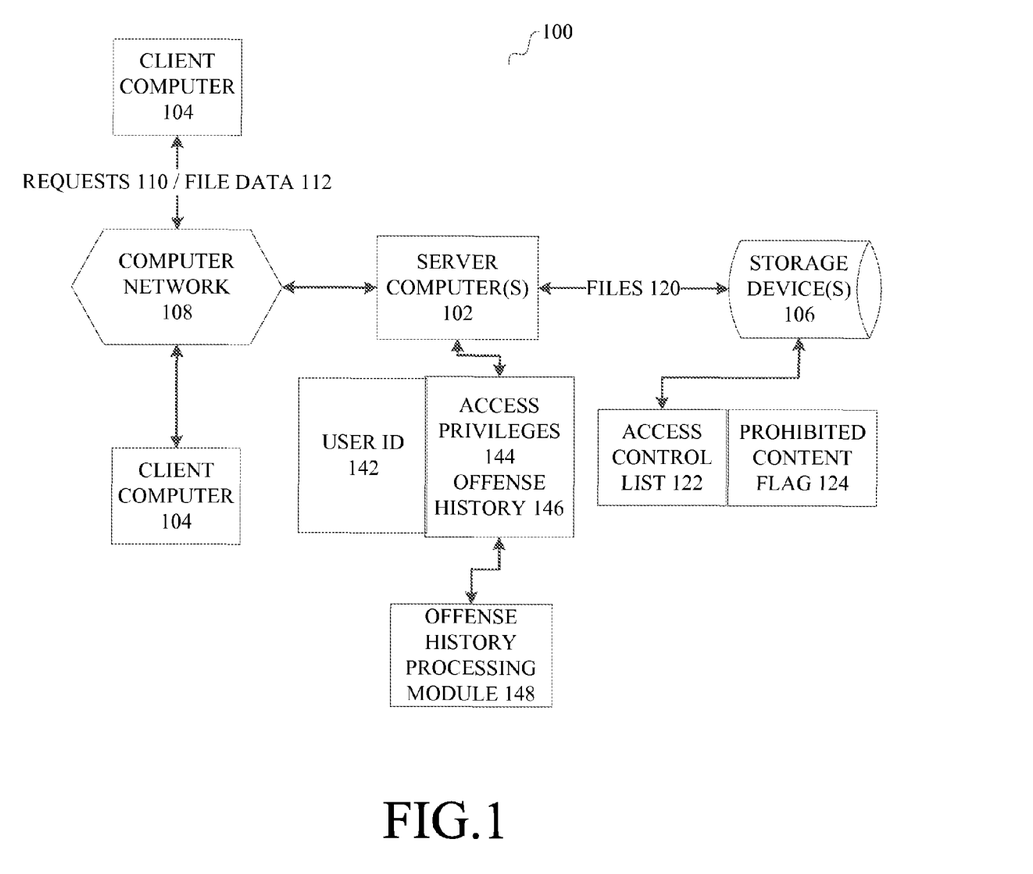
FIG. 1 is a block diagram of an example shared storage system from a service provider.

Referring to FIG. 1, a shared storage system 100 includes one or more server computers 102 on which the storage system is hosted by a service provider. Files 120 are stored on one or more storage devices 106 that are accessed by the server computers 102. Users access files stored on the shared storage system through client computers 104 that connect to the server computer 102 over a computer network 108. In one implementation, the shared storage system in an online, networked storage system, such as a storage service provided to end users over the Internet. Each of the server computers and client computers can be implemented using a computing device such as described below in connection with FIG. 6.

The client computer 104 typically includes a browser application that communicates with the server computers 102 using a conventional communication protocol. Typically, the server computer 102 prompts the user for authentication information to access an account. After receiving the authentication information and successfully authenticating the user, the server computer presents a user with information relating to their account, such as files and folder containing files that the user has stored on the shared storage system. Other operations also can be made available, such as uploading, deleting, modifying and downloading files and folders, defining collections of files, sharing files and collections of files with other users, accessing files and collections of files shared by other users, and searching for files and folders, according to a user's access privileges. In general, a client computer 104 sends requests 110 for information to the server computers 102, in response to which the server computers provide file data 112 to the client computer 104, where the file data 112 can be metadata about a file or contents of a file. The server computers maintain, store, update and access account information 140 about a user 142, including information indicative of access privileges 144, such as whether the account is enabled, whether sharing of files is enabled and the like.

A file 120 has information stored about it that the server computers 102 use to manage access to the file by various users. Each file 120 has, in particular, an access control list 122 and a prohibited content flag 124. The access control list 122 indicates which users are permitted to access a file, and the nature of those permissions.

As described in more detail below, the prohibited content flag 124 indicates whether the file is determined to have prohibited content. Such a determination typically is made, for example, in response to a request by a third part that the content be removed. For example, a party may inform the service provider that a particular file has been identified as including copyrighted content, and the user having the file stored in his or her account is unauthorized to distribute it.

When one or more files are determined to include prohibited content, then an incident is recorded as part of an offense history 146 for the user account. This offense history 146 is accessed by an offense history processing module 148, which can modify the access privileges 144 of the user.

A file can include one or more independently accessible portions, or file streams, which contain different information. In particular a file can include content and metadata about that content in separately accessible portions of the file. The access control list can differentiate access for users at the file stream level in addition to the file level. The access control list also can distinguish between an "owner" of a file system object and others. In one implementation, the system can limit access to prohibited content by others, while allowing full access to the owner of a file system, regardless of whether the file system object is marked as having prohibited content.

Given this context, an example implementation will be described in more detail in connection with FIGS. 2-5.

Figure 2:
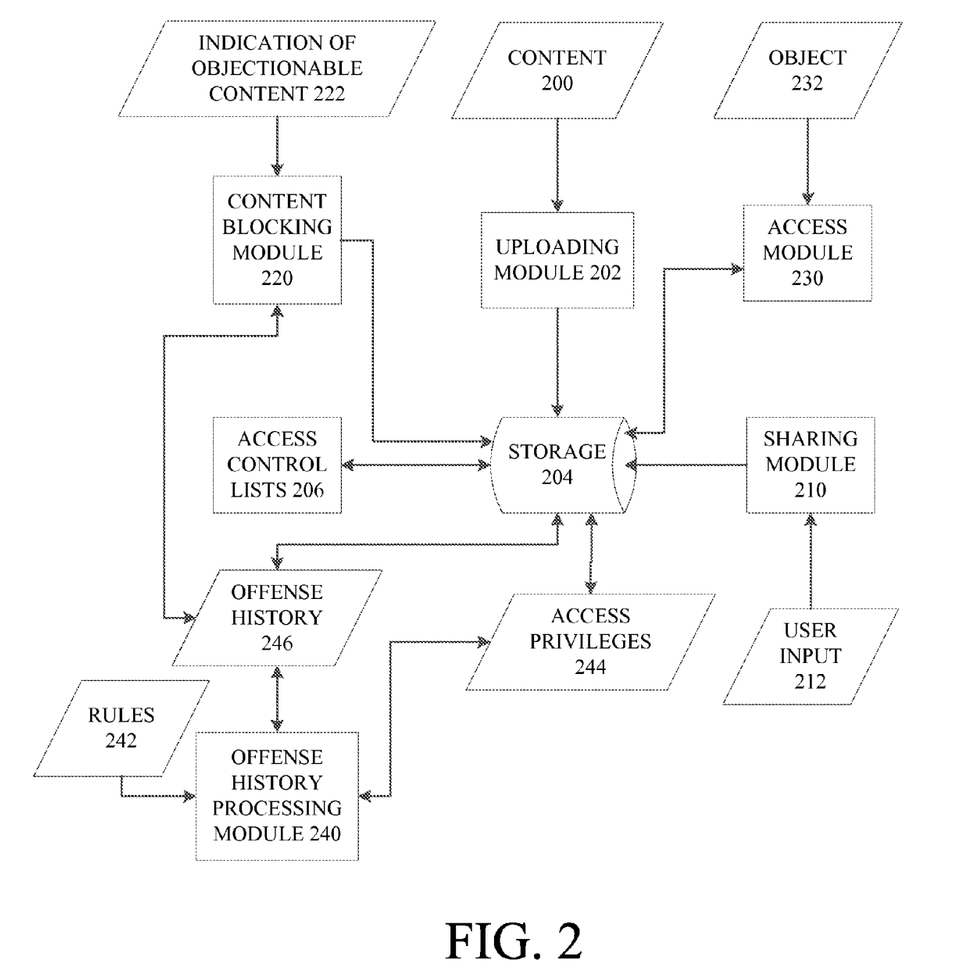
FIG. 2 is a data flow diagram illustrating an example implementation of access restrictions

FIG. 2 illustrates a data flow diagram of a system in which content can be shared by one user with another user through a shared storage system such as shown in FIG. 1. Content 200 is handled by an uploading module 202 and then stored in storage 204. Through the uploading module, a user can identify content to be uploaded, and navigate to a storage folder on the shared storage system in which to store the uploaded content. The uploading module causes the uploaded content to be stored. Access control lists 206 are created that associate the content with this user and otherwise specify permissions for various entities that can access this content.

For a user to share information, a sharing module 210 is accessed. In response to user input 212, one or more items of stored content are identified by the user. Also though the sharing module, through user input 212, a user can identify one or more other users with whom the selected content is to be shared. The sharing module 210 creates a collection of the selected content, and indicates on the access control list for the collection that the other identified users are authorized to access this content. A user can be an individual, a device, a system process, an application or other entity that can access content through the storage system. There are a variety of ways in which a user can specify such a collection, the users with whom it is to be shared, and the permissions to be given to those users, the foregoing merely being one example.

A content blocking module 220 can receive indications 222 of content to be blocked due to prohibited content. For example, such information can be reported by other parties. The access control list for that content is updated to indicate that there is prohibited content to be blocked when shared. The content blocking module, or other program module (not shown), also updates the offense history 246 of a user when content is marked as prohibited. An offense history processing module 240 uses rules 242 to determine whether user privileges 244 for a user should be modified based on the incidents in the offense history 246.

Through an access module 230, other users can access content in collections to which they have been given authorization. Given an indication 232 of an object, such as a file, to be accessed, the access module determines whether the user is authorized to access the selected content, and determines if the content is blocked, by using the access control list. If the user is authorized to access the content, the content is provided to the user. In the event that the user is authorized, but the content is blocked, a graphical user interface of the access module can indicate to the user that the content is present but access to the content is blocked.

Figure 3:
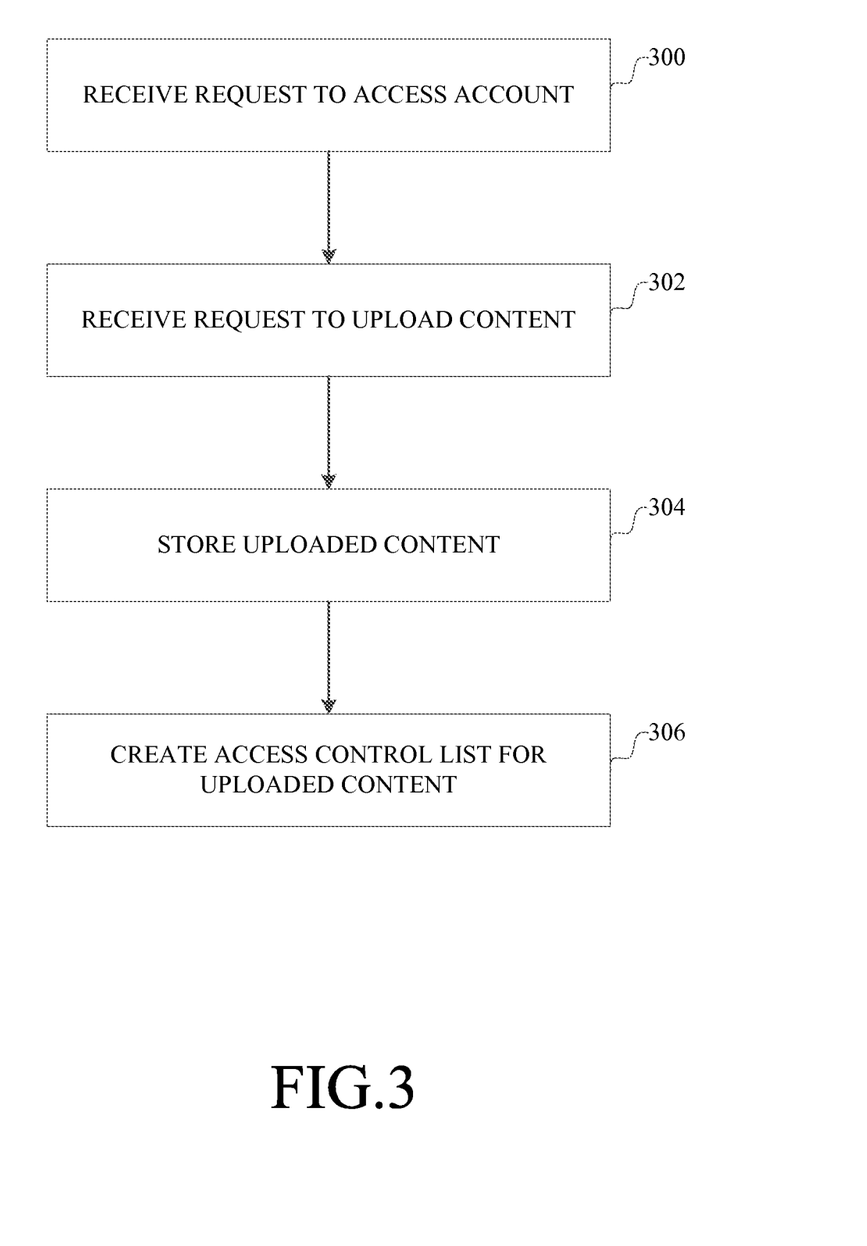
FIG. 3 is a flow chart of an example implementation of uploading content to the storage system.

FIG. 3 is a flowchart describing an example implementation of operation of such a system when uploading content.

A system receives 300 a request from a user to access his or her account. After allowing access, the system can receive 302 a request from the user to upload content to the storage. If the user's access has already been limited due to being a repeat offender, such access might not be provided. The system receives, processes and stores 304 the content in the storage system, including creating 306 the access control list for each file which is uploaded. The access control list can initially indicate that the user is the owner of the content and the sole user authorized to access that content. Additionally, any prohibited content flag is initially clear.

Figure 4:
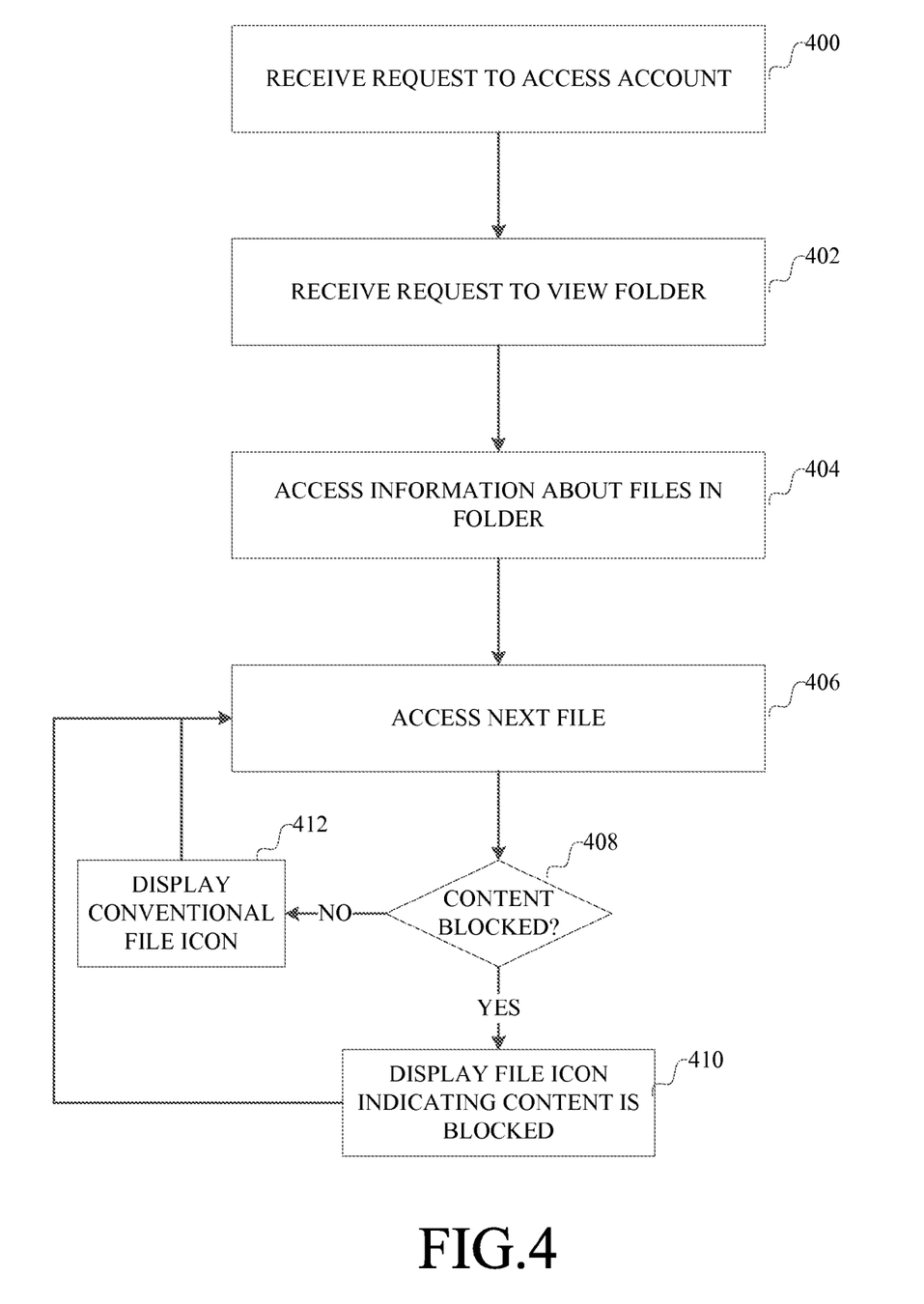
FIG. 4 is a flow chart of an example implementation of accessing content on the storage system.

FIG. 4 is a flowchart describing an example implementation of operation of such a system when accessing content.

A system receives 400 a request form a user to access his or her account. If the user's access has already been limited due to being a repeat offender, such access might not be provided. After allowing access, the system can receive 402 a request from the user to view the contents of a selected folder. The system accesses 404 information about the contents of the selected folder. For each file, as indicated at 406, the system determines 408 whether the access to the file is authorized and whether access to content is blocked. If content is blocked, then an indication of the file, such as an icon, is displayed 410, with the icon indicating that access to the content is blocked. Otherwise, a conventional indication of the file is displayed 412.

Figure 5:
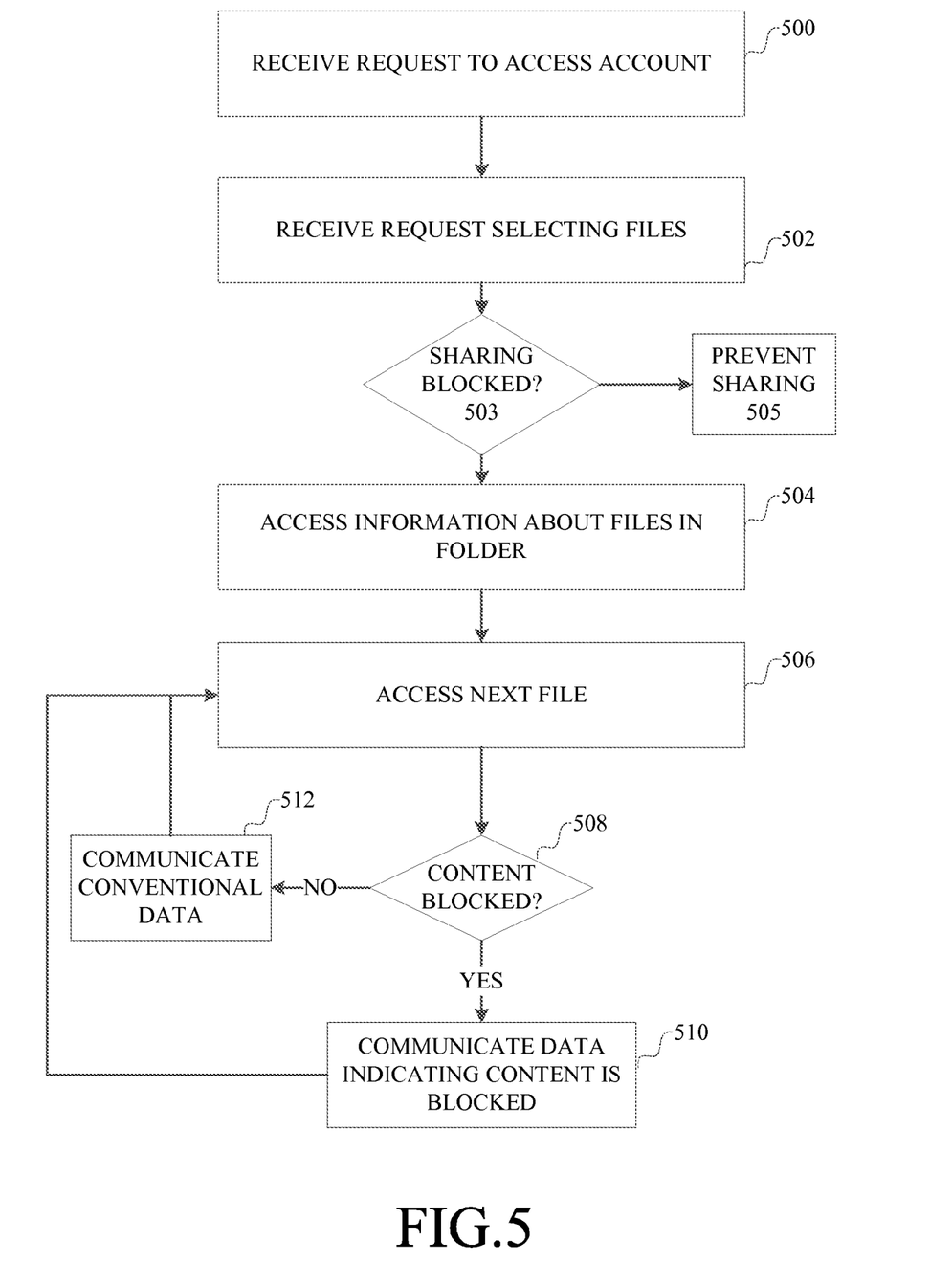
FIG. 5 is a flow chart of an example implementation of sharing content on the storage system.

FIG. 5 is a flowchart describing an example implementation of operation of such a system when a user shares content.

A system receives 500 a request form a user to access his or her account. If the user's access has already been limited due to being a repeat offender, such access might not be provided. After allowing access, the system can receive 502 a request from the user identifying selected files to be shared, and a request to share those files. If sharing is blocked for this user, as indicated at 503, processing terminates 505 and the system can inform the user that sharing has been blocked. Otherwise the system accesses 504 information about the selected files. For each file, as indicated at 506, the system determines 508 whether the access to the file is authorized and whether access to content is blocked. If content is blocked, then the information about the file that is communicated 510 to the other user includes data indicating that access to the content is blocked. Otherwise, conventional information about the file is communicated 512.

Figure 6:
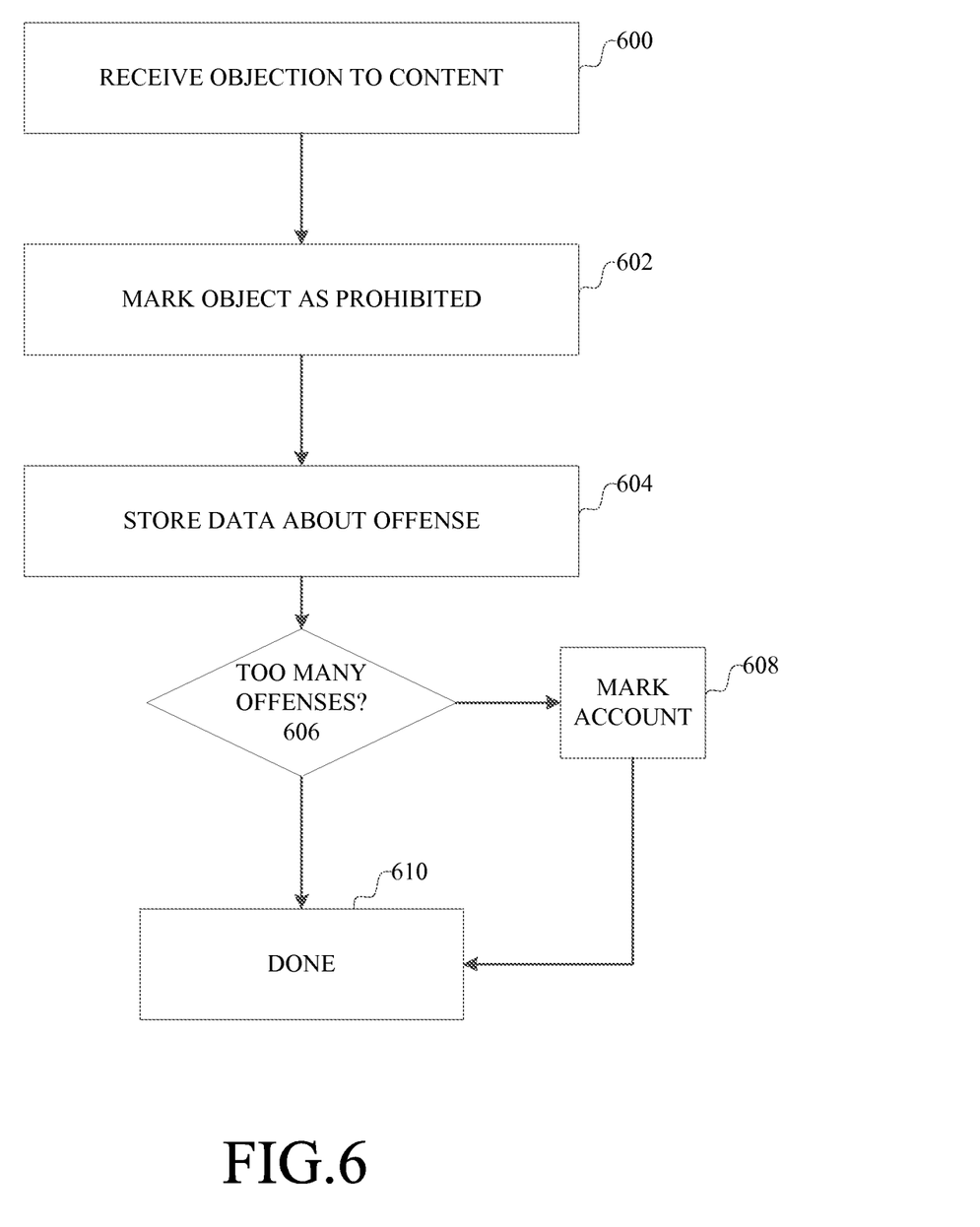
FIG. 6 is a flow chart of an example implementation of changing access privileges of a user based on an incident history.

Referring now to FIG. 6, a flowchart describing an example implementation of processing the offense history of a user will now be described.

The system receives 600 data indicating that a file object has been identified as including prohibited content. The file object then is marked 602. Data about the offense is then stored 604 in the user's offense history. The offense history is processed and if there are too many offenses that have occurred during a set period of time, as indicated at 606, then the user's account is marked 608 as having too many offenses. This data can be used to control various access privileges for the user, such as the ability to share content with other users.

Having now described an example implementation, a computer with which components of such a system are designed to operate will now be described. The following description is intended to provide a brief, general description of a suitable computer with which such a system can be implemented. The computer can be any of a variety of general purpose or special purpose computing hardware configurations. Examples of well-known computers that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
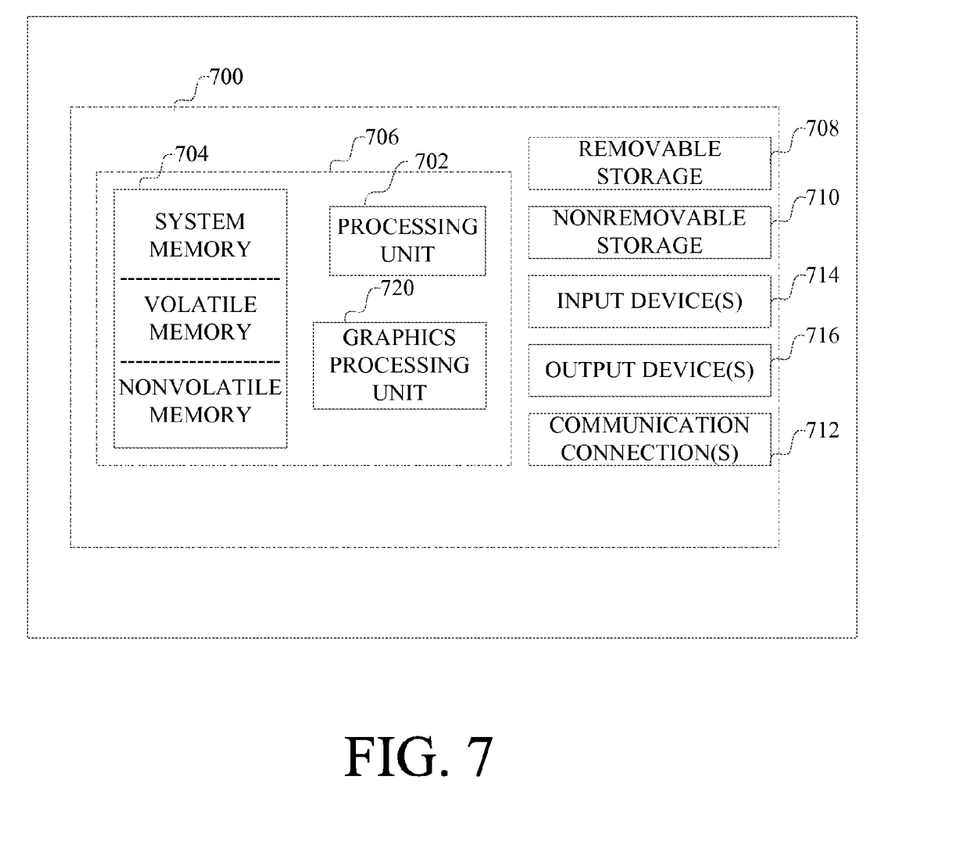
FIG. 7 is a block diagram of an example computer with which components of such a system can be implemented.

FIG. 7 illustrates an example of a suitable computer. This is only one example of a suitable computer and is not intended to suggest any limitation as to the scope of use or functionality of such a computer.

With reference to FIG. 7, an example computer 700, in a basic configuration, includes at least one processing unit 702 and memory 704. The computer may include multiple processing units and/or additional co-processing units such as graphics processing unit 720. Depending on the exact configuration and type of computer, memory 704 may be volatile (such as RAM), non-volatile (such as ROM, flash memory, etc.) or some combination of the two. This configuration is illustrated in FIG. 7 by dashed line 706.

Computer 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information in addressable physical storage locations. Such information includes, but is not limited to, computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices. A storage medium can be used to store the desired information in a manner which can be accessed by computer 700. Any such computer storage media may be part of computer 700.

Computer 700 may also contain communications connection(s) 712 that allow the device to communicate with other devices over a communication medium. Communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 712 are devices that interface with the communication media to transmit data over and receive data from communication media, such as a network interface.

Computer 700 may have various input device(s) 714 such as a keyboard, mouse, pen, camera, touch input device, and so on. Output device(s) 716 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Such computer instructions can be stored on computer storage to provide an article of manufacture. Generally, program modules include routines, programs, objects, components, data structures, and so on, that, when processed by a processing unit, instruct the processing unit to perform particular tasks or implement particular abstract data types. This computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process performed in a computer of a shared storage system comprising computer storage, comprising:
   receiving, by a processing device of the computer, objects over a computer network, each received object being associated with a user account to store the received object on the shared storage system;
   storing, by the processing device, the received objects on the computer storage of the shared storage system, each received object being stored in a manner indicating the user account that stored the received object in the shared storage system;
   marking, by the processing device, an object from among the objects stored on the shared storage system as containing prohibited content;
   in response to the marking of an object as containing prohibited content, storing, by the processing device, incident data in an incident history record in the computer storage, the incident data indicating at least the user account that stored the marked object in the shared storage system;
   processing, by the processing device, the incident history record for incident data associated with a selected user account;
   modifying, by the processing device, an access privilege of the selected user account according to rules applied to at least the incident data in the incident history record associated with the selected user account as processed from the incident history record;
   in response to a request to access an object from among the stored objects,
       determining, by the processing device, if content in the requested object is marked as containing prohibited content; and
       in response to a determination that the content in the requested object is marked as containing prohibited content, limiting, by the processing device, access to the content from the requested object as stored in the shared storage system.

2. The computer-implemented process of claim 1, wherein modifying comprises terminating privileges of the user account to share objects with other user accounts.

3. The computer-implemented process of claim 1, further comprising:
   allowing a group of objects from a first user account to be shared with one or more second user accounts;
   determining if the group of objects includes an object that is marked as containing prohibited content;
   limiting access through the one or more second user accounts to the prohibited content in the object that is marked, while allowing access to other objects in the group of objects through the one or more second user accounts.

4. The computer-implemented process of claim 1, wherein the object is a file and marking comprises maintaining an access control list for the file, wherein the access control list includes data indicating a file contains prohibited content.

5. The computer-implemented process of claim 1, wherein the object is a file and limiting access to content in the object includes preventing access to a file stream containing the prohibited content.

6. The computer-implemented process of claim 1, wherein the object is a file and limiting access to content in the object includes allowing access to a file stream containing metadata about the file.

7. The computer-implemented process of claim 1, wherein the object is a file storing an image and limiting access to content in the file includes preventing access to a reduced image representative of the image stored in the file.

8. The computer-implemented process of claim 1, further comprising:
   allowing sharing from a first user account, with one or more second user accounts, the object that is marked as containing prohibited content;
   limiting access through the one or more second user accounts to the prohibited content in the object.

9. The computer-implemented process of claim 1, further comprising:
   displaying an indication that the object is marked as including prohibited content.

10. An article of manufacture comprising:
   computer storage, and computer program instructions stored on the computer storage, wherein the computer program instructions, when processed by a processing device of a computer of a shared storage system comprising computer storage, instruct the processing device to perform a process comprising:

receiving objects over a computer network, each received object being associated with a user account to store the received object on the shared storage system;

storing the received objects on the computer storage of the shared storage system, each received object being stored in a manner indicating the user account that stored the received object in the shared storage system;

marking an object from among the objects stored on the shared storage system as containing prohibited content;

in response to the marking of an object as containing prohibited content, storing incident data in an incident history record in the computer storage, the incident data indicating at least the user account that stored the marked object in the shared storage system;

processing the incident history record for incident data associated with a selected user account;

modifying an access privilege of the selected user account according to rules applied to at least the incident data in the incident history record associated with the selected user account as processed from the incident history record;

in response to a request to access an object from among the stored objects,
 determining if content in the requested object is marked as containing prohibited content; and
 in response to a determination that the content in the requested object is marked as containing prohibited content, limiting access to the content from the requested object as stored in the shared storage system.

11. The article of manufacture of claim 10, wherein modifying comprises terminating privileges of the user account to share objects with other user accounts.

12. The article of manufacture of claim 10, wherein the object is a file and limiting access to content in the object includes preventing access to a file stream containing the prohibited content.

13. The article of manufacture of claim 10, wherein the process further comprises:
 allowing the object that is marked as containing prohibited content from a first user account to be shared with one or more second user accounts;
 limiting access through the one or more second user accounts to the prohibited content in the object.

14. The article of manufacture of claim 10, wherein the process further comprises:
 displaying an indication that the object is marked as including prohibited content.

15. A computer storage system comprising:
 shared computer storage in which objects are stored containing content, the objects being received over a computer network from user computers, each received object being stored in a manner indicating a user account that stored the received object in the shared storage system;
 one or more processing devices, connected to the shared computer storage, programmed to:
  mark an object from among the objects stored on the shared computer storage as containing prohibited content;
  in response to marking an object as containing prohibited content, store incident data in an incident history record on the shared computer storage, the incident data indicating at least the user account that stored the marked object in the shared storage system;
  process the incident history record for incident data associated with a selected user account;
  modify an access privilege of the selected user account according to rules applied to at least the incident data in the incident history record associated with the selected user account as processed from the incident history record; and
  in response to a request to access an object from among the objects stored on the shared computer storage, and in further response to a determination that the content included in the requested object is marked as prohibited, limit access to the content included in the requested object from the shared computer storage.

16. The computer storage system of claim 15, the one or more processors being programmed to:
 allow a group of objects from a first user account to be shared with one or more second user accounts;
 determining if the group of objects includes an object that is marked as containing prohibited content;
 limiting access by the one or more second user accounts to the prohibited content in the object that is marked, while allowing access through the one or more second user accounts to other objects in the group of objects.

17. The computer storage system of claim 15, further comprising one or more server computers, including the one or more processors, and connected to a computer network, wherein a plurality of computers access the one or more server computers over the computer network to access objects stored on the storage.

18. The computer storage system of claim 15, the one or more processors being programmed to cause an indication to be displayed that an object being accessed includes prohibited content.

19. The computer storage system of claim 15, wherein to modify an access privilege, the the one or more processors are further programmed to terminate privileges of the user account to share objects with other user accounts.

20. The computer storage system of claim 15, wherein the one or more processors are further programmed to:
 allow sharing from a first user account, with one or more second user accounts, the object that is marked as containing prohibited content;
 limit access through the one or more second user accounts to the prohibited content in the shared object.

* * * * *